United States Patent [19]
de Jong et al.

[11] Patent Number: 5,407,703
[45] Date of Patent: Apr. 18, 1995

[54] METHOD OF MANUFACTURE OF A CERAMIC MEMBRANE FOR MICRO-FILTRATION

[75] Inventors: Remco de Jong, Leiden; Hendrikus H. Visser, Beverwijk; Marlies Westra, Haarlem; Adrianus J. Wittebrood, Velserbroek, all of Netherlands

[73] Assignee: Hoogovens Industrial Ceramics B.V.

[21] Appl. No.: 106,627

[22] Filed: Aug. 16, 1993

[30] Foreign Application Priority Data

Aug. 20, 1992 [NL] Netherlands ............ 9201483

[51] Int. Cl.⁶ .................. B05D 3/02; B05D 5/00
[52] U.S. Cl. ................... 427/226; 427/244; 427/245; 427/376.2; 427/393.6; 427/399; 427/417; 427/419.2; 427/419.7
[58] Field of Search ......... 427/226, 244, 245, 376.2, 427/393.6, 417, 419.2, 419.7, 399

[56] References Cited

U.S. PATENT DOCUMENTS

| 4,738,874 | 4/1988 | Berardo et al. ............ 427/244 |
| 4,822,692 | 4/1989 | Koehler .................... 427/244 |

FOREIGN PATENT DOCUMENTS

| 0188950 | 7/1986 | European Pat. Off. . |
| 0320033 | 6/1989 | European Pat. Off. . |
| 0344961 | 12/1989 | European Pat. Off. . |
| 0479553 | 4/1992 | European Pat. Off. . |

*Primary Examiner*—Janyce Bell
*Attorney, Agent, or Firm*—Stevens, Davis, Miller & Mosher

[57] ABSTRACT

In the manufacture of a ceramic membrane for micro-filtration having a porous ceramic carrier and a ceramic micro-filtration coating on a bulk surface of said carrier, the steps are performed of (i) silanizing said carrier at least at said bulk surface thereof, (ii) after step (i), applying a coating film containing metal oxide to said bulk surface of said carrier by contacting a stable suspension of non-agglomerated metal oxide particles with said bulk surface and moving said suspension along said bulk surface, so that said coating film remains adhering to said bulk surface, and (iii) drying and heating said carrier and said coating film thereon, so as to sinter at least said coating film and thereby form said micro-filtration coating on said carrier.

In order to improve the uniformity and evenness of the coating film of the suspension, the stable suspension contains an organic additive which increases the yield stress of the stable suspension to a value greater than zero. The organic additive is one which is capable of giving said stable suspension a yield stress of at least 0.1 Pa at a concentration of not more than 5% by weight of the liquid component of the suspension without causing agglomeration of the particles.

11 Claims, No Drawings

METHOD OF MANUFACTURE OF A CERAMIC MEMBRANE FOR MICRO-FILTRATION

BACKGROUND OF THE INVENTION

1. Field of the Invention

The invention relates to a method for the manufacture of a ceramic membrane for micro-filtration comprising a porous ceramic carrier and a micro-filtration coating of sintered ceramic material, on a bulk surface thereof. By "bulk surface" is meant a bounding surface or geometric surface of the carrier body, not the interior pore surfaces thereof.

2. Description of the Prior Art

A micro-filtration coating in such a membrane typically is a coating with an average pore size of between 20 nm and 1 μm and a thickness of between 10 and 200 μm. The carrier may have pores of between 0.1 and 50 μm and may have a thickness of between 0.5 mm and 1 cm or greater. These dimensions are not limitative for the present invention.

EP-A-320033 describes a process for making such a ceramic membrane, comprising the steps of
(i) silanising the carrier;
(ii) applying the micro-filtration coating onto the carrier by means of a film-coating technique using a suspension of a metal oxide;
(iii) drying and sintering the product obtained in step (ii).

Silanisation is a pretreatment of the carrier, described for example in EP-A-320033, in which the affinity between the porous carrier and the suspension forming the microporous coating is reduced so that the suspended particles are prevented from penetrating the pores of the carrier, while it is still possible sufficiently to wet the surface of the porous carrier. Reduction of this affinity is preferably obtained by treating the carrier with a silane solution.

Film-coating is a method for applying the coating onto the carrier by essentially allowing a suspension to flow along the surface of the carrier, e.g. under the effect of gravity, so that as it flows a coating film remains on the bulk surface of the carrier. EP-A-320033 mentioned above illustrates film coating. Further explanation may be found in J. A. Tallmadge & Ch. Gutfinger: 'Entrainment of liquid films', Ind. Eng. Chem., 59(11), 18–34 (1967) and L. E. Scriven: 'Physics and application of dip coating and spin coating', in Better ceramics through chemistry, III (1988), pp. 717–729.

Compared with this film-coating, another method exists for applying the micro-filtration coating, namely slip casting, in which a suspension is filtered through the porous carrier under the effect of a pressure difference, so that a coating remains on the carrier as filter cake. This slip casting technique has the disadvantage that particles from the suspension penetrate the pores of the carrier, so that the permeability of the resulting membrane is lower.

A problem with the method known from EP-A-320033 is that in the micro-filtration coating an inhomogeneous or broad pore size distribution is obtained so that shrinkage is non-uniform and sintering cracks arise in the sintered micro-filtration coating. This gives a high reject percentage of membranes obtained with the known method.

With hindsight, it can be seen that in EP-A-320033, insufficient attention has been paid to the condition of the suspension when it contacts the silanised porous ceramic carrier. In order to obtain a thick layer, in Examples 1 and 2 of that document the suspension used contained alumina dispersed in demineralised water. At the pH of this suspension, alumina particles tend to agglomerate, with the result that relatively large particles in the form of agglomerates are deposited on the carrier surface. When the deposited layer is subsequently sintered, the layer shows non-uniform behaviour because of the presence of the agglomerates. The sintering is therefore inhomogeneous, leading to an inhomogeneous product, with cracks due to non-uniform shrinkage. On the other hand, in Example 3 of EP-A-320033, a peptised sol is used to produce a very thin layer. The peptised sol contains primary particles, but not agglomerates. This sol also contains 1% of glycerol. It is mentioned here that glycerol has no effect on the yield stress of the sol.

EP-A-344961 describes a similar method of forming a composite membrane useful for filtration having a metal carrier and a ceramic coating. In Example 1, there are described some experiments to determine an optimum viscosity of a suspension (specifically a boehmite sol) which is used to coat stainless steel membranes. The steel membrane is pretreated with a solution of sodium dichromate and sulphuric acid. To vary the viscosity of the boehmite sol, the binders polyvinyl alcohol and methyl cellulose were added. The stated aim was to achieve an appreciable increase in viscosity, with the purpose of aiding the sol or suspension to bridge the rather coarse pores of the support. It was found that the minimum binder addition was 10%, in order to yield an appreciable increase in viscosity. More than 50 wt % of binder results in gelation. Optimum binder additions were determined to be about 18 wt % for one particular sol and about 40 wt % for a sol of lower concentration. The sols were deposited by spray coating. Multiple spraying with up to five coats was necessary to ensure a complete coating. The maximum film thickness obtained was 10 μm. Although addition of binders in such large concentrations in order to increase viscosity may also lead to an increase of the yield stress of the suspension or sol, there is no discussion of this, and it is not relevant to the process described in this document which involves spray coating. A disadvantage of such high concentrations of binder is that the large amount of binder must be burned out of the coating layer prior to the sintering, which causes defects in the layer such as large pores, peeling of the layer or crater formation.

In the present specification, the term suspension is used, and is intended to include also sols and colloids. The difference between these various forms of suspension is only a matter of particle size.

SUMMARY OF THE INVENTION

The object of the invention is to improve the known methods so that a ceramic membrane can be obtained with a highly crack-free micro-filtration coating.

The present invention is based on the realisations firstly that the problems described above can be avoided by using a stable suspension in which the particles are not agglomerated, i.e. they remain as primary particles so that the coating layer is highly uniform, and secondly that an improvement in the formation of the layer, in the contact film-forming method described above, is obtained if the yield stress of the suspension has a value greater than zero. A yield stress value greater than zero is obtained by including an organic additive in the suspension which is capable of providing a yield stress of at least 0.1 Pa at a concentration of not more than 5% by weight and without causing agglomeration of the particles. Such an additive is present in low concentration, and is therefore easily removed from the layer without causing damage to the layer, prior to sintering.

Yield stress is a known rheological property of a liquid, and is explained for example in Encyclopedia of Fluid Mechanics (ed. N. P. Cheremisinoff), Volume 5, Chapter 6, page 225. A well dispersed unflocculated suspension exhibiting Newtonian flow has a yield stress of zero.

Because the yield stress of the suspension is greater than zero, the coating layer formed on the carrier surface is held in place on the carrier by the rheological property of the liquid, as a highly uniform and even layer. This is effective particularly when the layer is on a vertical or sloping surface of the membrane, since the tendency of the layer to run down the surface or to form drips and tear-drops can be minimized or eliminated.

The colloid chemical stability of a suspension of a metal oxide depends on the Van der Waals forces and on the forces arising from electrical charges. In a basic environment the particles are negatively charged, and they are positively charged in an acidic environment. In between the two there is an area where the charge of the particles is small or nil. With $Al_2O_3$ that is the case close to pH 8. At or close to this nil charge region, the particles do not repulse one another and form agglomerates. The suspension is then unstable. In the present invention a stable suspension is now used, that is to say a suspension in which the particles do not, or practically do not, agglomerate. They are stable as primary particles.

A stable suspension may be obtained by adding a poly-electrolyte or by suitably selecting the pH. Preferably the suspension in the present invention is acid- or base-stabilised. For example, when the suspended metal oxide is $Al_2O_3$, an acid-stabilised suspension is used with a pH in the range 4 to 5. In this manner it is not necessary to add any poly-electrolyte to the suspension and unpredicted changes in the properties of the suspension caused by the poly-electrolyte are prevented.

As a result of non-retention of water in the agglomerates or the smaller particles, a non-agglomerated suspension has a low viscosity so that during or following film-coating, the micro-filtration coating film remaining on the carrier may start to "run". The micro-filtration coating film which is applied by film-coating should not flow downwards, or only very sluggishly. This is achieved in the invention by appropriate selection of a rheological property of the suspension namely the yield stress. The desired result is that the yield stress of the micro-filtration coating film is greater than its gravity-induced stress, at least for a vertical or slanting surface. In general, the yield stress of stable suspensions in the past has been too low and the micro-filtration coating film has tended to break up.

In accordance with the invention a colloid chemically stable suspension is used in combination with increased yield stress, the yield stress of the suspension being increased by adding an organic additive which does not substantially affect the stability of the suspension (i.e. does not cause agglomeration or flocculation) and can provide the desired increase in yield stress at low concentration. Preferably xanthan gum (a polysaccharide) is used, with the advantage that it has no side-effects or scarcely any. Other suitable additives are guar gum, gum Arabic and gum tragacanth.

The yield stress obtained by addition of the organic additive is preferably greater than 0.1 Pa, more preferably greater than 0.5 Pa. The additive selected is preferably capable of giving the suspension a yield stress of 0.1 Pa at a concentration of not more than 1% by weight or more preferably at a concentration of not more than 0.5% by weight. The additive may be present in an amount of not more than 1%, preferably not more than 0.5% by weight of the liquid component of the suspension.

The apparent viscosity of the suspension (as measured at 20° C., by the Haake viscometer, cylinder system), is preferably not more than 300 mPa·s at 100 $s^{-1}$, and typically in the range 40–100 mPa·s at 100 $s^{-1}$.

By the method of the present invention using the film-coating technique, the following advantages can be obtained:

(a) A stable suspension can be prepared in a reproducible way. The properties of the stable suspension, such as particle size distribution and yield stress are only slightly susceptible to small differences in pH, quantity of additives and intensity of stirring and mixing;

(b) The suspension is only slightly susceptible to ageing. The suspension properties barely alter with time;

(c) The reproducibility of the micro-filtration coating obtained by film-coating is good;

(d) The packing and the pore size distribution of the micro-filtration coating is homogeneous. This means that far fewer cracks occur in the micro-filtration coating;

(e) A relatively thicker micro-filtration coating can be obtained without cracks forming.

DESCRIPTION OF THE PREFERRED EMBODIMENTS

Examples of the invention will now be given, but the invention is not limited by them, and other embodiments and modifications are available to those skilled in the art, within the invention.

EXAMPLE 1

A tube with an external diameter of 14 mm and a wall thickness of 3 mm consisting of sintered $Al_2O_3$ (Amperit 740.1) with a pore size of 5 μm is immersed in a 1% silane solution (Silane PC 12 from Permacol BV, Holland) in acetone for 10 minutes. Then the tube is dried in air at 50° C. Next a microporous coating film is applied to the interior of the tube thus silanised, by vertical film coating as described and illustrated in EP-A-320033, using a stable suspension of the following composition:

40% vol alumina particles (CT2000SG from Alcoa, average grain size 1.1 μm) in demineralised water;
0.3M acetic acid;
0.03% wt Xanthan Gum (based on weight of liquid component of the suspension);
0.01% wt Surfadone LP100 (based on liquid weight) as a surfactant.

The pH was 4.4, the yield stress between 1 and 1.5 Pa and the viscosity 40–50 mPa·s at 100 $s^{-1}$, at 20° C.

The tube was coated at a rate of 7 mm/s and sintered for 1 hour at 1300° C. The thickness of the micro-filtration coating obtained was 50–70 μm. The average pore size was 0.17 μm. The pore size distribution was ascertained using a Coulter porometer and was as follows:
$d_{min}=0.10$ μm
$d_{50\%}=0.17$ μm
$d_{90\%}=0.22$ μm
$d_{max}=0.24$ μm The permeability was approximately 1500 l/m²·hr bar (this is water permeability, measured by a standard technique, i.e. measuring the flow of water through a fixed area under constant pressure).

No cracks were detected in the micro-filtration coating of the ceramic membrane so produced.

EXAMPLE 2

A microporous coating is vertically applied by film-coating to the interior of a silanised tube identical to that of Example 1, by the method of EP-A-320033 using a stable suspension of the following composition:
40% vol alumina particles (A4000SG from Alcoa, average grain size 2.8 μm) in demineralised water; 0.3M acetic acid;
0.21% wt Xanthan gum (based on liquid weight);
0.01% wt Surfadone LP100 (based on liquid weight).

The pH was 4.3, the yield stress between 1.5 and 2 Pa and the viscosity 65–80 mPa·s at 100 s⁻¹, at 20° C.

The tube was coated at a rate of 8 mm/s and sintered for 1 hour at 1350° C. The thickness of the micro-filtration coating was 60–80 μm. The average pore size was 0.38 μm. The pore size distribution was ascertained using a Coulter porometer and was as follows:
$d_{min}=0.22$ μm
$d_{50\%}=0.38$ μm
$d_{90\%}=0.50$ μm
$d_{max}=0.53$ μm The permeability measured as in Example 1 was approximately 6500 l/m²·hr·bar.

No cracks were detected in the micro-filtration coating.

EXAMPLE 3

A microporous coating is vertically applied by film coating to the interior of a silanised tube identical to that of Example 1 by the method of EP-A-320033, using a stable suspension of the following composition:
40% vol alumina particles (CT2000SG from Alcoa, average particle size 1.1 μm) in demineralised water;
0.17% wt citric acid (based on weight of alumina);
0.33% wt Xanthan gum (based on liquid weight);
0.02% wt Surfadone LP100 (based on liquid weight).

The pH was between 4 and 5, the yield stress between 2 and 3 Pa and the viscosity 90–100 mPa·s at 100 s⁻¹, at 20° C.

The tube was coated at a rate of 8 mm/s and sintered for 1 hour at 1300° C. The thickness of the micro-filtration coating was 50–70 μm. The average pore size was 0.15 μm. The pore size distribution was ascertained using a Coulter porometer and was as follows:
$d_{min}=0.10$ μm
$d_{50\%}=0.15$ μm
$d_{90\%}=0.19$ μm
$d_{max}=0.20$ μm The permeability measured as in Example 1 was approximately 1300 l/m²·hr·bar.

No cracks were detected in the micro-filtration coating.

What is claimed is:

1. A method of manufacture of a ceramic membrane for micro-filtration comprising a porous ceramic carrier having a surface and a ceramic micro-filtration coating on said surface of said carrier, said method comprising the steps of
   (i) silanizing said carrier at least at said surface thereof;
   (ii) moving a stable liquid suspension comprising non-agglomerated metal oxide particles and gum additive along the surface of said carrier to coat said surface of said carrier with a coating film containing metal oxide, said gum additive being effective to increase the yield stress of said stable suspension to a value greater than zero and being one which is capable of giving said stable liquid suspension a yield stress of at least 0.1 Pa at a concentration of not more than 5% by weight of the liquid component of the suspension without causing agglomeration of said metal oxide particles; and
   (iii) drying and heating said coated carrier to sinter at least said coating film and thereby form said micro-filtration coating on said carrier.

2. The method according to claim 1 wherein said stable suspension has a yield stress greater than 0.1 Pa.

3. The method according to claim 2 wherein said stable suspension has a yield stress greater than 0.5 Pa.

4. The method according to claim 1 wherein said gum additive is one which is capable of giving said suspension a yield stress of at least 0.1 Pa at a concentration of not more than 1% by weight of the liquid component of the suspension.

5. The method according to claim 4 wherein said gum additive is one which is capable of giving said suspension a yield stress of at least 0.1 Pa at a concentration of not more than 0.5% by weight of the liquid component of the suspension.

6. The method according to claim 1 wherein said gum additive is present in a concentration of not more than 1% by weight of the liquid component of the suspension.

7. The method according to claim 6 wherein said gum additive is present in a concentration of not more than 0.5% by weight of the liquid component of the suspension.

8. The method according to claim 1 wherein said suspension is one of acid-stabilised and base-stabilised.

9. The method according to claim 8 wherein said metal oxide is Al₂O₃ and said suspension is acid-stabilised at a pH in the range 4 to 5.

10. The method according to claim 1 wherein said gum additive is selected from the group consisting of xanthan gum, guar gum, gum Arabic and gum tragacanth.

11. In a method of manufacture of a ceramic membrane for micro-filtration comprising a porous ceramic carrier having a surface and a ceramic micro-filtration coating on said surface of said carrier, said method comprising the steps of
    (i) silanizing said carrier at least at said surface thereof;
    (ii) moving a stable liquid suspension comprising non-agglomerated metal oxide particles along the surface of said carrier to coat said surface of said carrier with a coating film containing metal oxide, and drying and heating said coated carrier to sinter at least said coating film and thereby form said micro-filtration coating on said carrier, the improvement that said stable liquid suspension contains a gum additive which gives said stable liquid suspension a yield stress of at least 0.1 Pa at a concentration of not more than 5% by weight of the liquid component of the suspension without causing agglomeration of said metal oxide particles.

* * * * *